July 31, 1956 C. BRAMMING 2,756,889
VACUUM BOTTLE WITH REMOVABLE BOTTOM
Filed Aug. 4, 1955
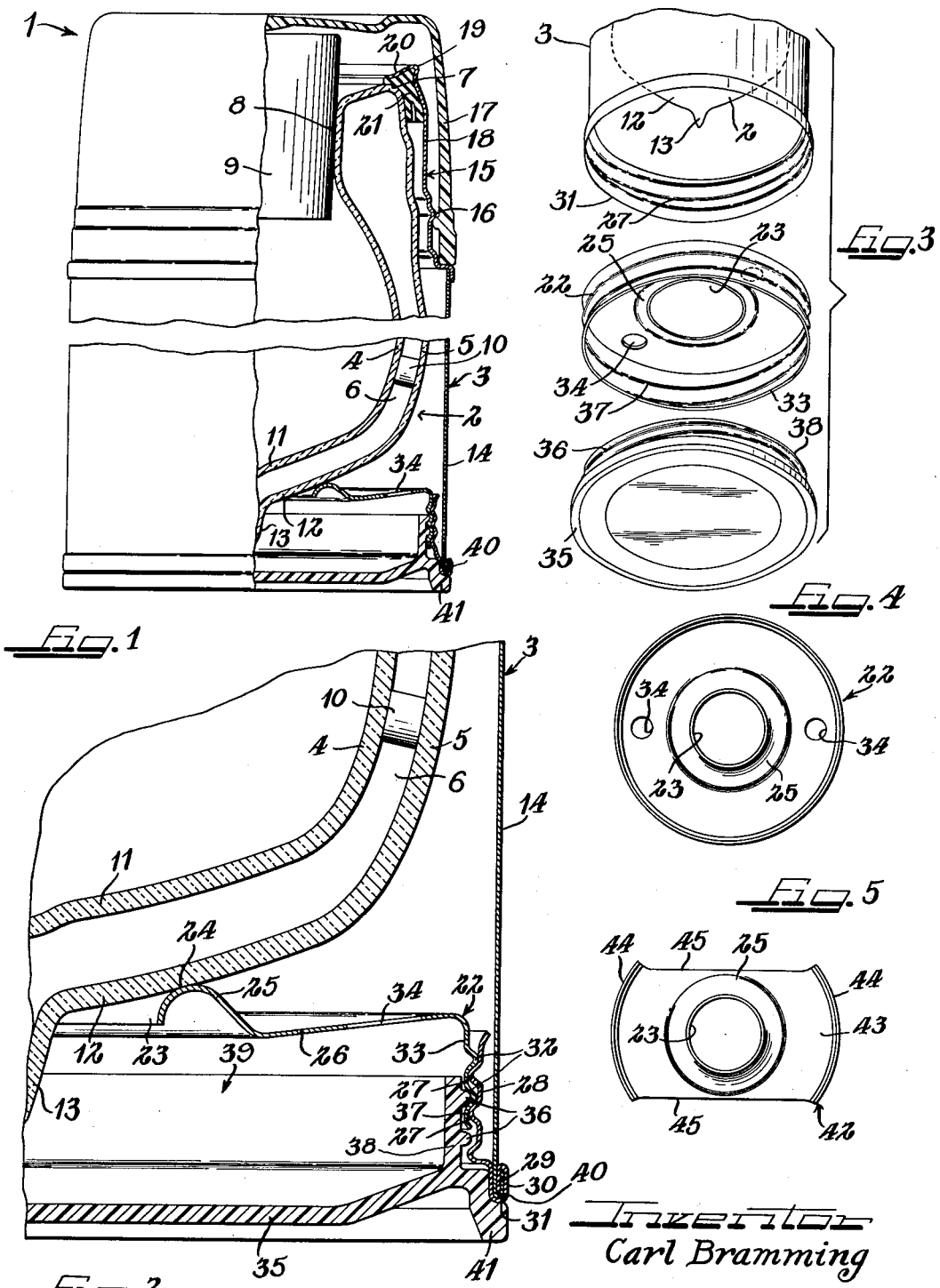
Inventor
Carl Bramming
Ooms, McDougall, Williams & Hersh
Attys.

United States Patent Office 2,756,889
Patented July 31, 1956

2,756,889

VACUUM BOTTLE WITH REMOVABLE BOTTOM

Carl Bramming, Nashville, Tenn., assignor to Aladdin Industries, Incorporated, Nashville, Tenn., a corporation of Illinois Application August 4, 1955, Serial No. 526,351

7 Claims. (Cl. 215—13)

This invention relates to a new and improved vacuum bottle of the type having a vacuum-insulated, bottle-shaped receptacle or filler received within a protective jacket.

One principal object of the present invention is to provide a new and improved vacuum bottle having a vacuum-insulated receptacle which is supported within a protective outer jacket by means of a member which is adapted to be threaded into the lower end of the jacket, the bottom of the jacket being closed by a cover adapted to be threaded into the supporting member.

A further object is to provide a new and improved vacuum bottle of the foregoing character in which the supporting member may be adjusted in the lower end of the jacket so as to exert a predetermined pressure against the lower end of the receptacle, the upper end of the receptacle thereby being positively maintained in sealing engagement with a gasket which is interposed between the receptacle and the upper end of the jacket.

It is another object to provide a new and improved vacuum bottle of the foregoing character in which the supporting member affords sufficiently firm support to prevent the receptacle from being disengaged from the gasket by the downward force normally exerted on the receptacle when a stopper is inserted into the receptacle.

Another object is to provide a new and improved vacuum bottle of the foregoing character in which the threaded supporting member may be adjusted so as to compensate for variations in the length of the receptacle and the protective jacket.

It is a further object to provide a new and improved vacuum bottle of the foregoing character in which the bottom cover locks the threaded supporting member in its adjusted position.

It is another object to provide a new and improved vacuum bottle of the foregoing character which is durable, inexpensive and easy to assemble and disassemble.

Further objects and advantages of the invention will be apparent from the following description, taken with the accompanying drawings, in which:

Figure 1 is an elevational view of a vacuum bottle constituting an illustrative embodiment of the invention, the view being partly in longitudinal section.

Fig. 2 is an enlarged fragmentary longitudinal sectional view showing details of a bottom closure arrangement embodied in the vacuum bottle of Fig. 1.

Fig. 3 is a fragmentary, exploded, perspective view illustrating details of the bottom closure arrangement.

Fig. 4 is a bottom view of a receptacle-supporting member employed in the bottom closure arrangement.

Fig. 5 is a bottom view of a modified receptacle-supporting member which may be substituted for the one shown in Fig. 4.

If the drawings are considered in greater detail, it will be seen that they illustrate a vacuum bottle 1 of the general type comprising a double-walled, vacuum-insulated, bottle-shaped receptacle or filler 2, which is housed within a protective jacket 3. The illustrated filler 2 is made of glass and comprises inner and outer walls 4 and 5 with an evacuated space 6 therebetween. The inner and outer walls 4 and 5 are joined at their upper ends to form a lip or top edge 7. An open mouth 8 is formed at the top of the inner wall 4 and is adapted to be closed by a removable stopper 9.

A plurality of pads or plugs 10 are interposed between the walls 4 and 5. At their lower ends, the walls 4 and 5 have rounded end wall portions 11 and 12. An axial tubulation 13 projects downwardly from the outer end portion 12, this tubulation resulting from the sealing off of the evacuated space 6 between the walls 4 and 5.

In general, the outer jacket 3 may assume various forms. As illustrated, the jacket 3 comprises a substantially cylindrical side wall 14 made of sheet metal, although it might be made of various other materials, such as various plastics, for example. The side wall is surmounted by an annular collar 15, which might be formed integrally with the side wall, but in this case is formed as a separate piece, suitably soldered, welded or otherwise joined to the upper end of the side wall. External thread elements 16 are formed on the collar 15 to receive an internally threaded cup 17, which provides a top closure for the jacket, in addition to serving as a drinking receptacle adapted to receive the contents of the vacuum bottle. Plastics or other suitable materials may be employed in the cup 17.

The illustrated collar 15 has a body or side wall portion 18 which is generally cylindrical in shape, but which tapers inwardly and upwardly. It will be seen that an outwardly projecting, overhanging pouring lip 19 is formed at the upper end of the side wall portion 18. The side wall portion 18 terminates in an annular flange 20 which slopes inwardly and downwardly from the pouring lip 19. A soft resilient annular gasket 21, made of plastic, rubber or rubber-like material, is interposed between the flange 20 and the lip 7 of the filler 2. It will be seen that the gasket 21 conforms generally in shape to the space between the lip 7 and the upper end of the collar 15. The flange 20 and the underlying gasket 21 overhang the lip 7, which thereby serves as a shoulder, cooperating with the flange and the gasket to limit upward movement of the filler 2 in the protective jacket 3.

In this instance, the filler 2 is assembled in the protective jacket 3 by being inserted upwardly through the lower end of the jacket. In its assembled relation, the filler is supported by means of a member or supporting bridge 22 which is disengageably mounted in the lower end of the side wall 14 on the jacket 3. In this instance, the bridge 22 is made of sheet metal, although it might be formed of various other materials, such as plastic, for example. An aperture 23 is formed axially in the illustrated bridge 22 to receive the rounded end portion 12 and the tubulation 13. An upwardly facing annular seat 24 is formed around the aperture 23 for engagement with the lower end of the filler 2. It will be seen that the seat 24 is formed, in this instance, by an arching, upwardly convex, annular convolution or ridge 25 formed at the center of the bridge 22. A thin coating of plastic or other soft material may be applied to the seat 24 to avoid scratching the glass of the outer wall 5.

As illustrated in Figs. 1–4, the bridge 22 is of dished, generally disk-shaped form. Thus, the bridge 22 comprises an annular wall portion 26 which extends outwardly from the annular convolution 25, the wall portion 26 being generally horizontal but being slightly inclined, upwardly and outwardly.

Provision is made for threading the receptacle-supporting bridge 22 into the lower end of jacket 3 so that the bridge may be adjusted to provide a predetermined pressure against the lower end of the receptacle. To this end, internal screw threads 27 are formed within the lower end of the side wall 14 on the jacket 3. While the threads 27 might be formed directly on the cylindrical side wall 14, it is preferred to form them on a separate annular bushing or collar 28, which is secured within the lower end of the side wall. In this instance, the side wall 14 and the threaded bushing 28 have lower end portions 29 and 30 which are rolled together to unit the bushing and the side wall. The rolled portion 30 presents a downwardly facing annular edge 31 at the lower end of the jacket 3.

To mate with the internal threads 27, external threads 32 are formed on the receptacle-supporting bridge 22. In this instance, the external threads 32 are formed in an annular generally cylindrical flange 33 which depends from the periphery of the annular disk 26.

In order to facilitate the tightening of the threaded bridge 22, apertures 34 are formed in the disk portion 26 to receive any suitable tightening tool.

While the bridge 22 affords firm, adequate support for the vacuum-insulated filler 2, it leaves the tubulation 13 exposed. Accordingly, it is preferred to close the lower end of the protective jacket 3 with a bottom cover 35, which is generally disk-shaped in form. External screw threads 36 are formed on the bottom cover 35 to mate with corresponding internal threads 37 formed on the depending flanges 33 of the bridge 22. In this instance, the flange 33 is made of sheet metal which is given helical convolutions to define both the external threads 32 and the internal threads 37. In other words, the inner surface of the external threads 32 provides the internal threads 37.

It will be seen that the external threads 36 on the bottom cover 35 are formed on an annular, upstanding flange 38 which is generally cylindrical in form. The flange 38 defines a shallow, upwardly facing cavity 39 in the cover 35. It will be seen that the tubulation 13 extends downwardly into the cavity 39 at the center of the cover 35.

In order to seal the bottom of the protective jacket 3, the cover 35 is formed with an upwardly facing shoulder 40 which is adapted to seat against the downwardly facing annular edge 31 at the lower end of the jacket. In this instance, the shoulder 40 is formed on a peripheral flange portion 41 of the cover 35.

In addition to closing the bottom of the jacket 3, the cover 35 acts in the manner of a lock nut to lock the bridge 22 in its adjusted position. When the cover 35 is tightened, the external threads 36 on the cover pull downwardly on the threads 37 of the bridge 22 so as to press the external threads 32 against the internal threads 27 on the bushing 28. In this way the bridge is frictionally locked against undesired movement.

In the assembly of the vacuum bottle, the gasket 21 is mounted on the lip 7 of the glass filler 2. Then the filler is inserted upwardly into the protective jacket 3 until the gasket 21 engages the flange 20 at the upper end of the collar 15. Next, the bridge 22 is threaded into the bushing 28 at the lower end of the jacket 3. The bridge is tightened to a predetermined extent so as to exert the desired force on the lower end of the vacuum-insulated filler 2. In this way, the lip 7 of the filler 2 is firmly held against the gasket 21, and the gasket, in turn, is firmly pressed against the flange 20. Thus, it will not be possible for any liquid to leak between the lip and the flange. Because of the threaded engagement between the bridge 22 and the jacket 3, the bridge may be adjusted to compensate for variations in the length of the filler 2 and the jacket 3. Such variations are normally to be expected in mass-producing the filler and the jacket. By utilizing the threaded bridge 22, it is possible to tolerate considerable variation in the length of the filler and the jacket.

After the bridge 22 is in place, the bottom cover 35 is screwed into the internal threads 37 on the bridge. The cover is tightened so as to bring the peripheral flange 41 into sealing engagement with the lower edge 31 on the jacket 3. In this way, any liquid that may leak into the space between the jacket and the filler will be retained until the vacuum bottle is disassembled for washing. Tightening the cover 35 will produce pressure between the threads on the bridge 22 and the bushing 28, so as to lock the bridge 22 in its adjusted position.

When the vacuum bottle is used, the filler 2 is firmly but resiliently supported by the bridge 22. The filler is supported with sufficient resilience to protect it against breakage due to shock. At the same time, the support for the filler is sufficiently firm to prevent substantial downward movement of the filler when the stopper 9 is pressed downwardly into the mouth 8. Accordingly, the lip 7 of the filler always remains in firm engagement with the gasket 21, even when the stopper 9 is pushed down with considerable force. There is never any chance for the filler to become unseated from the gasket so as to permit leakage of fluid into the space between the filler and the jacket.

Ordinarily, the vacuum bottle may be cleaned sufficiently by rinsing out the inside of the filler and wiping the other parts of the vacuum bottle. However, the vacuum bottle may readily be disassembled for complete washing. This may be done by unscrewing the bottom cover 35 and the bridge 22, whereupon the filler 2 may be removed from the jacket 3. It is also an easy matter to reassemble the vacuum bottle by inserting the filler into the jacket, screwing the bridge snugly against the cover and screwing the bottom cover 35 into the bridge until the cover seats on the jacket. Even if the vacuum bottle is improperly assembled, without sufficiently tightening the bridge 22, any liquid that may leak between the lip 7 and the flange 20 will be retained in the space between the filler and the jacket until the vacuum bottle is again disassembled for cleaning.

Fig. 5 illustrates a modified bridge 42 which is the same as the bridge 22 except that the bridge 42 has a generally horizontal wall portion 43 and depending, peripheral flange means 44, which are partly cut away to define transverse chordally extending edges 45. Thus, the wall 43 corresponds to a segmental portion of the wall 26, while the flange elements 44 represent segments of the flange 33 on the bridge 22. The chordal edges 45 provide means whereby the bridge 42 may be grasped manually or by a suitable tool, in screwing the bridge into the jacket 3. Accordingly, the tool-receiving holes 34 of the bridge 22 are not needed in the bridge 42 and are omitted. In all other respects, the bridge 42 may be the same as the bridge 22. It will be evident that the modified bridge 42 may be directly substituted for the bridge 22.

Various other modifications, alternative constructions and equivalents may be employed without departing from the true spirit and scope of the invention as exemplified in the foregoing description and defined in the following claims.

I claim:

1. In a vacuum bottle, the combination comprising a double-walled, vacuum-insulated, bottle-shaped receptacle having an upper portion formed into an annular open mouth, said receptacle having a closed lower portion formed with an axial protuberance, a protective jacket received around said receptacle and including an upper portion having an inwardly and downwardly projecting annular flange, said upper portion having an outwardly projecting, overhanging pouring lip formed around the outside of said flange, a soft resilient annular gasket received between said flange and said mouth on said receptacle to prevent passage of liquid between said flange and said mouth, said jacket having a lower portion formed with a downwardly facing annular edge, said lower portion including means defining internal screw threads therein, a resilient receptacle supporting member having an axial aperture therein receiving said protuberance, said member having an annular upwardly facing seat around said aperture and engaging said lower portion of said receptacle to support said receptacle and maintain said mouth thereof against said gasket, said member having depending peripheral flange means formed with external threads disengageably mating with said internal threads for adjustably tightening said member against said receptacle, said depending flange means having internal threads formed therein, and a circular bottom closure member having an upwardly extending annular flange formed with external screw threads disengageably mating with said internal threads on said supporting member, said closure member having an outwardly projecting peripheral flange disengageably seating against said downwardly facing edge on said jacket to seal the lower end thereof, said closure member locking said supporting member in its adjusted position.

2. In a vacuum bottle, the combination comprising a double-walled, vacuum-insulated receptacle having a closed lower end portion, a protective jacket received around said receptacle and having a lower portion with means defining an internal thread element therein, a receptacle-supporting member engaging said lower portion of said receptacle to support said receptacle, said supporting member having an external thread element disengageably mating with said internal thread element for adjustably tightening said member against said receptacle, said supporting member having an internal thread element therein, and a bottom closure engaging said jacket and having an external thread element disengageably mating with said internal thread element in said supporting member to lock said supporting member in its adjusted position.

3. In a vacuum bottle, the combination comprising a double-walled, vacuum-insulated, bottle-shaped receptacle having a closed lower portion, a protective jacket received around said receptacle and including a lower portion with means defining an internal screw thread element therein, a resilient receptacle supporting member having an upwardly facing seat engaging said lower portion of said receptacle to support said receptacle, said member having depending annular flange means formed with an external thread element disengageably mating with said internal thread element for adjustably tightening said member against said receptacle, said depending flange means having an internal thread element formed therein, and a generally circular bottom closure having an upwardly extending annular flange formed with an external screw thread element disengageably mating with said internal thread element on said member, said closure having an outwardly projecting peripheral flange disengageably seating against said jacket to seal the lower end thereof, said closure locking said supporting member in its adjusted position.

4. In a vacuum bottle, the combination comprising a vacuum-insulated receptacle having an annular upper end portion, said receptacle having a closed lower portion, a protective jacket received around said receptacle and having an upper portion terminating in an inwardly extending annular flange, an annular gasket disposed between said annular upper end portion and said flange, said jacket having a lower portion with means defining an internal screw thread element therein, a receptacle-supporting member having an upwardly facing seat engaging said lower portion of said receptacle to support said receptacle and maintain engagement between said annular upper end portion and said gasket, said supporting member having an external thread element thereon disengageably mating with said internal thread element for adjustably tightening said member against said receptacle, said supporting member having an internal thread element therein, and a bottom closure having an external thread element thereon disengageably mating with said internal thread element in said supporting member, said closure having means disengageably seating against said jacket, said closure being effective to lock said supporting member in its adjusted position within said jacket.

5. In a vacuum bottle, the combination comprising a double-walled, vacuum-insulated receptacle having an upper end formed into an annular lip defining an open mouth, said receptacle having a closed lower end portion with an axially disposed protuberance thereon, a protective jacket received around said receptacle and having an upper portion terminating in an inwardly projecting annular flange, a soft resilient annular gasket disposed between said lip and said flange, said jacket having a lower portion with means defining internal screw threads therein, said lower portion having a downwardly facing annular edge below said screw threads, a receptacle-supporting member having an axial aperture therein receiving said protuberance, said supporting member having an upwardly facing annular seat around said axial aperture and engaging said lower end portion of said receptacle to support said receptacle and maintain engagement between said lip and said gasket, said supporting member including a peripheral portion having external threads disengageably mating with said internal threads for adjustably tightening said member against said receptacle, said supporting member having means defining internal threads therein, and a circular bottom closure having an annular upwardly projecting flange formed with external threads disengageably mating with said internal threads in said supporting member, said closure having a peripheral outwardly projecting annular flange disengageably seating against said annular edge on said jacket, said closure being effective to close the lower end of said jacket and to lock said supporting member in its adjusted position within said internal threads on said jacket.

6. A bottom closure and supporting means for a vacuum bottle comprising an inner insulated food container and an outer protecttive casing, said means including an upwardly extending thread-defining portion provided circumferentially of the bottom of said casing, a bridge portion having a central aperture adapted to receive the bottom of said container and presenting an outer thread-defining skirt portion for engagement with said upwardly extending thread-defining portion on said casing and a bottom closure member for said casing having a thread-defining portion for engagement with the inner periphery of said outer thread-defining skirt portion.

7. A bottom closure and supporting means for a vacuum bottle comprising an inner insulated food container and an outer protective casing, said means including an upwardly extending thread-defining portion provided circumferentially of the bottom of said casing, a bridge portion having a central aperture adapted to receive the bottom of said container and presenting an outer thread-defining skirt portion for engagement with said upwardly extending thread-defining portion on said casing and a bottom closure member for said casing having a thread-defining portion for engagement with the inner periphery of said outer thread-defining skirt portion and presenting a shoulder portion for engagement with the bottom edge of said casing.

No references cited.